United States Patent
Itoyama et al.

[19]

[11] Patent Number: 6,155,954
[45] Date of Patent: Dec. 5, 2000

[54] ENGINE OUTPUT CONTROL DEVICE FOR HYBRID VEHICLE

[75] Inventors: Hiroyuki Itoyama, Yokohama; Yasuhiko Kitajima, Zushi; Yoshitaka Deguchi, Yokosuka, all of Japan

[73] Assignee: Nissan Motor Co., Ltd., Yokohama, Japan

[21] Appl. No.: 09/401,492

[22] Filed: Sep. 22, 1999

[30] Foreign Application Priority Data

Sep. 22, 1998 [JP] Japan .................. 10-268037

[51] Int. Cl.$^7$ .................. B60L 11/00; B60K 6/00
[52] U.S. Cl. .................. 477/5
[58] Field of Search .................. 477/5, 3

[56] References Cited

U.S. PATENT DOCUMENTS

| | | |
|---|---|---|
| 5,993,351 | 11/1999 | Deguchi et al. .................. 477/5 |
| 6,048,289 | 4/2000 | Hattori et al. .................. 477/5 |
| 6,053,842 | 4/2000 | Kitada et al. .................. 477/5 |

OTHER PUBLICATIONS

Tetsudo Nippon Co., "Automotive Engineering," vol. 46. No. 7, pp. 39–52 (Jun. 1997).

*Primary Examiner*—Dirk Wright
*Attorney, Agent, or Firm*—Foley & Lardner

[57] ABSTRACT

In a hybrid vehicle wherein an engine (2) and a motor/generator (1) are connected in a state wherein they can be driven mutually, and the engine (2) is connected to drive wheels (8) via a motor (4) via a clutch (3), the output torque of the engine is precisely controlled. A control device to perform this control comprises a mechanism (39, 40) which increases and decreases the output torque of the engine (2), a sensor (11) which detects the output of the motor/generator (1), and a microprocessor (16) programmed to control the output torque increase and decrease mechanism (39, 40) so that the output of the motor/generator (1) is zero when the engine is in the idle running state and the clutch (3) is released.

17 Claims, 9 Drawing Sheets

ENGINE OUTPUT CONTROL DEVICE FOR HYBRID VEHICLE

FIELD OF THE INVENTION

This invention relates to the control of the engine output of a parallel hybrid vehicle using an engine and motor in conjunction as a drive force source.

BACKGROUND OF THE INVENTION

A parallel hybrid vehicle which uses an engine and a motor in conjunction, and runs on the drive force of either or both of the engine and the motor, is disclosed by the following reference. "Automotive engineering" VOL.46, No.7, page 39–52, Tetsudo Nippon Co., June, 1997.

This parallel hybrid vehicle runs under the power of the motor in a low running load region, and starts the engine to increase drive force when the load increases.

SUMMARY OF THE INVENTION

Although predictable, stable output characteristics are obtained from a motor, the output characteristics of the engine vary according to cooling water temperature, atmospheric pressure and fuel properties.

Therefore, the actual engine output torque obtained will vary for the same accelerator depression amount. Moreover, the idle rotation speed also fluctuates.

As a result, when the vehicle is running under both the motor and the engine, it is difficult to control the output torque as a whole with sufficient precision compared to the case when the vehicle is running only under the motor. Moreover, even when there is a change-over between the motor and the engine, the torque will vary in stepwise fashion and a so-called torque shock will occur, unless both output torques are identical.

It is therefore an object of this invention to improve the precision of the engine output control of a parallel hybrid vehicle.

In order to achieve the above object, this invention provides an engine output control device for use with a hybrid vehicle wherein an engine and a motor/generator are connected so that the engine and the motor/generator can be driven by each another, and the engine is connected with a motor and a drive wheel via a clutch. The controller comprises a mechanism which increases and decreases an output torque of the engine, a sensor which detects an output of the motor /generator, and a microprocessor programmed to control the output torque increase and decrease mechanism so that the output of the motor/generator is equal to a predetermined output when the engine is in a predetermined running state and the clutch is released.

This invention also provides an engine output control method for a hybrid vehicle wherein an engine and a motor/generator are connected so that the engine and the motor/generator can be driven by each another, and the engine is connected with a motor and a drive wheel via a clutch. The method comprises detecting an output of the motor/generator, and controlling the output of the motor/generator to be equal to a predetermined output when the engine is in a predetermined running state and the clutch is released.

The details as well as other features and advantages of this invention are set forth in the remainder of the specification and are shown in the accompanying drawings.

DESCRIPTION OF THE PREFERRED EMBODIMENTS

Figure 1:
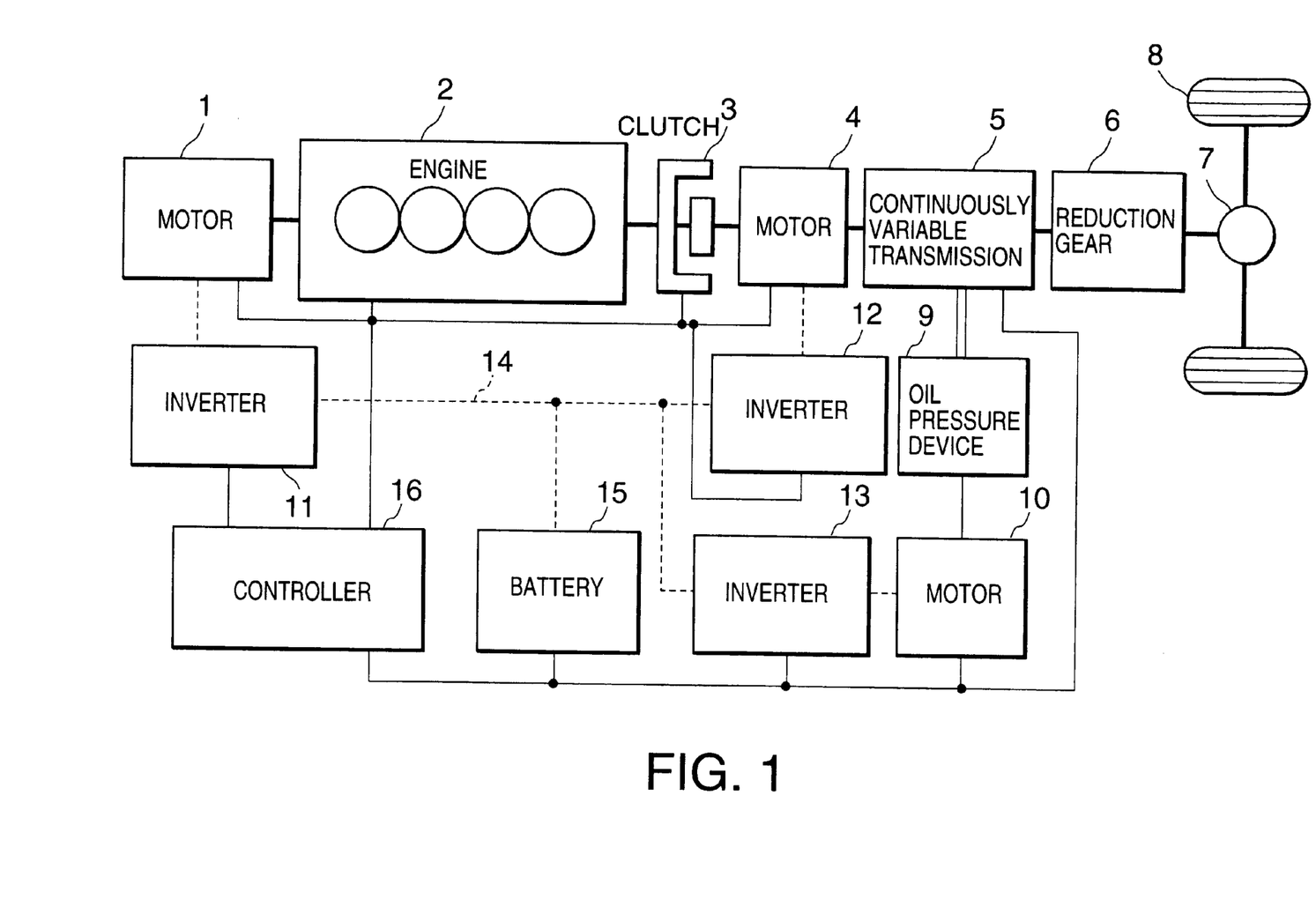
FIG. 1 is a schematic diagram of a hybrid vehicle to which this invention is applied.

Referring to FIG. 1 of the drawings, a parallel hybrid vehicle to which this invention is applied comprises an engine 2 connected to a motor 4 through a clutch 3.

When the clutch 3 is released, only the output of the motor 4 is transmitted to drive wheels 8 via a continuously variable transmission 5, gear 6 and differential gear 7. When the clutch 3 is engaged, both the drive force of the engine 2 and that of the motor 4 are transmitted to the drive wheels 8 via the same path.

The clutch 3 comprises a powder clutch which can adjust the transmitted torque.

The continuously variable transmission 5 is a V-belt continuously variable transmission which transmits the drive force at an arbitrary speed ratio via a V-belt looped about a pair of pulleys. The speed ratio of the continuously variable transmission 5 varies according to an oil pressure supplied from an oil pressure device 9.

Another motor 1 is also connected to the engine 2. The motor 1 is used for startup of the engine 2 as well as for power generation.

The motor 4 is mainly used for driving the drive wheels 8, but when braking of the vehicle is required, it also preforms a regenerative braking by generating power. The motors 1 and 4 therefore comprise a motor/ generator.

Yet another motor 10 is provided for driving an oil pump with which the oil pressure device 9 is provided. Unlike the motors 1 and 4, the motor 10 operates only as a motor.

Figure 3:
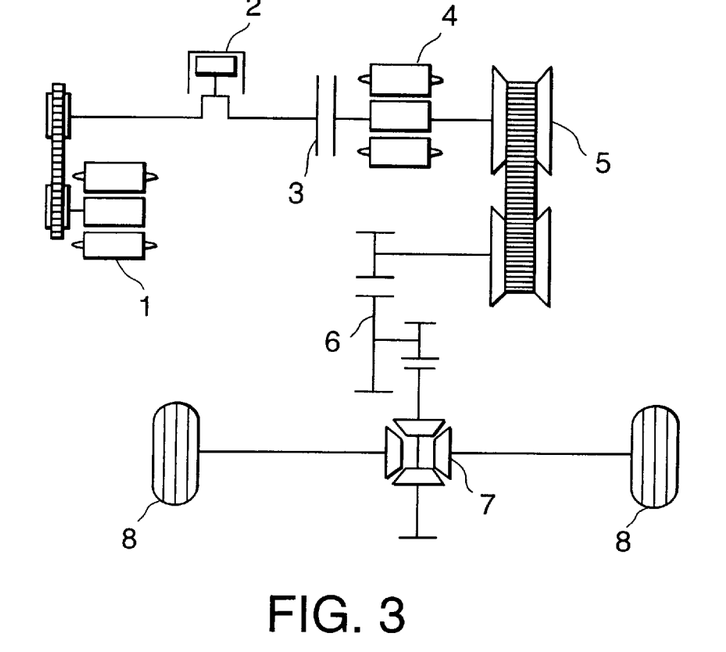
FIG. 3 is a schematic diagram of a drive mechanism of the hybrid vehicle.

Next, referring to FIG. 3, a possible arrangement of the above elements of the drive mechanism will be described in detail.

A rotation shaft of the engine 2 in this figure is directly linked to an input shaft of the clutch 3. The motor 1 is driven by the engine 2 via a belt. The rotation shaft of the motor 4 is directly linked to an output shaft of the clutch 3 and an input shaft of the continuously variable transmission 5.

Figure 4:
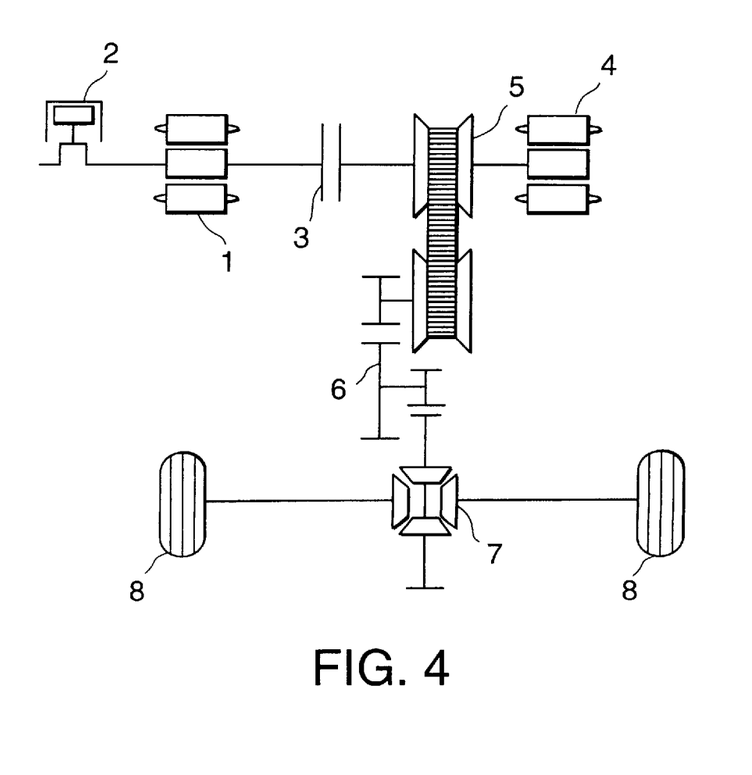
FIG. 4 is similar to FIG. 3, but showing a possible variation of the drive mechanism.

Next, another possible arrangement of instruments will be described with reference to FIG. 4.

In this figure, the rotation shaft of the motor 1 is directly linked to the rotation shaft of the engine 2, and the rotation shaft of the motor 1 is also joined to the input shaft of the continuously variable transmission 5 via the clutch 3. Further, the rotation shaft of the motor 4 is directly linked to the input shaft of the continuously variable transmission 5.

Any of the above drive mechanisms can be applied to the hybrid vehicle shown in FIG. 1.

If the engine 2 and motor 4 are joined via the clutch 3, the motor 4 is directly linked to the input shaft of the continuously variable transmission 5, and the motor 1 is driven by the engine 2, a drive mechanism having still another construction may also be applied to the hybrid vehicle.

Referring again to FIG. 1, the motors 1, 4 and 10 comprise alternating current motors, the running of each of these motors 1, 4 and 10 being respectively controlled by a controller 16 via inverters 11, 12 and 13. Direct current motors may also be used for each of the motors 1, 4 and 10. In this case, the inverters are replaced by direct current/direct current converters.

In FIG. 1, a bold line represents a transmission path of mechanical force, a broken line represents an electric power transmission path, a thin line represents a signal transmission path, and a double line represents a transmission path of oil pressure, respectively.

The inverters 11, 12 and 13 are connected to a direct current link 14.

A battery 15 is connected to the direct current link 14. The inverters 11, 12 and 13 convert the direct current of the battery 15 into an alternating current, and supply it to the motors 1, 4 and 10.

Moreover, the alternating current generated by the motors 1 and 4 is converted into a direct current by the inverters 11 and 12 which charges the battery 15. Thus, by directly interconnecting the motors 1, 4 and 10 via the direct current link 14, the current generated by any motor may be used to directly supply the drive current of another motor via the direct current link 14 without storing it in the battery 15.

As the battery 15, various types of battery, such as a lithium ion battery, a nickel hydrogen battery, a lead cell and an electrical double layer capacitor, or power capacitor, can be used.

The engaging and release of the clutch 3, and the transmission torque are controlled by the controller 16 via control signals.

The controller 16 also controls the rotation speed of the motors 1, 4 and 10, the output torque, the speed ratio of the continuously variable transmission 5, the fuel injection amount of the engine 2, fuel injection timing and ignition timing via various control signals.

The controller 16 comprises a microcomputer equipped with a central processing unit (CPU), read-only memory (ROM), random access memory (RAM), and input/output interface (I/O interface).

Figure 2:
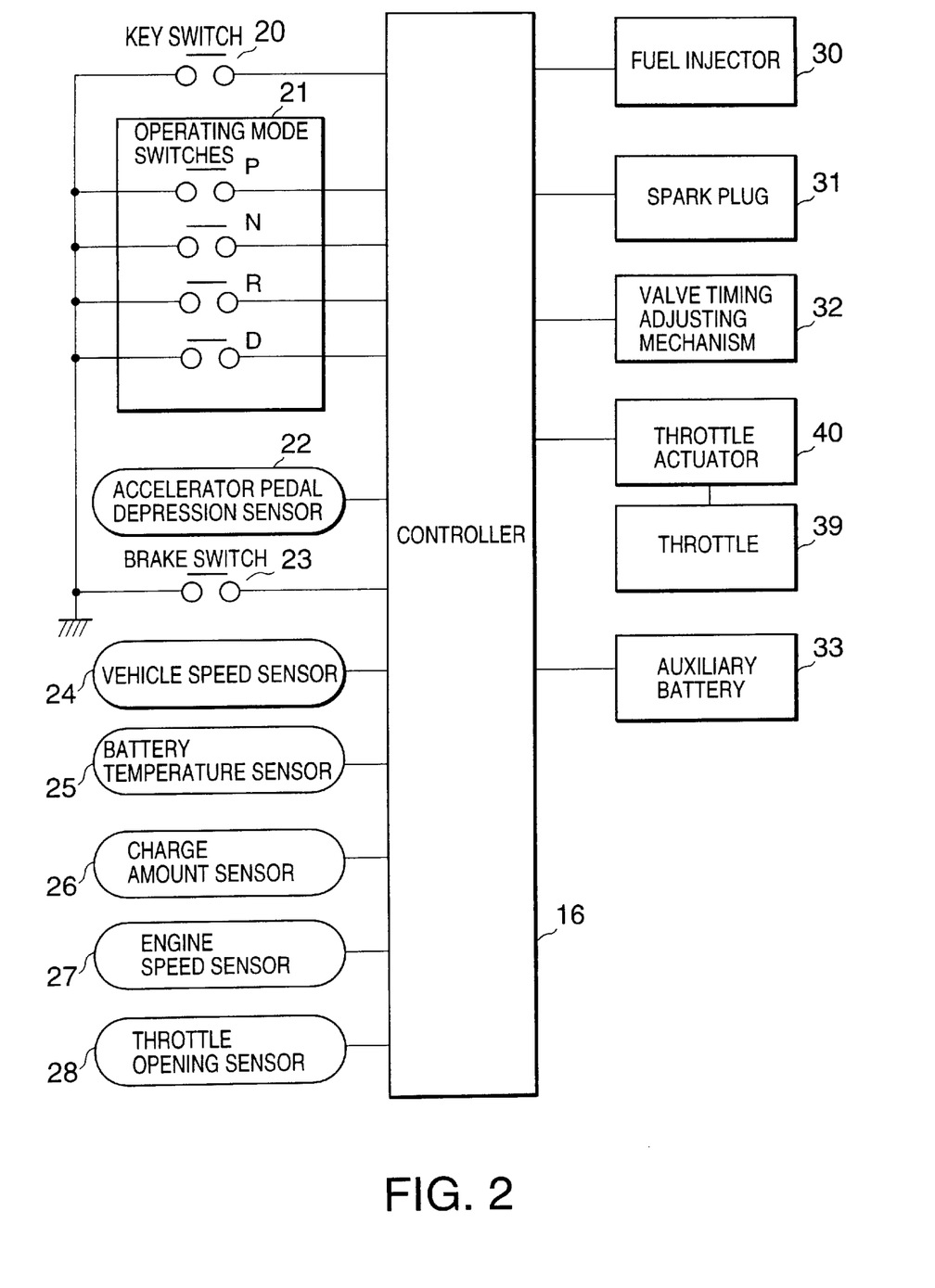
FIG. 2 is a schematic diagram of an engine output control device according to this invention.

Next, referring to FIG. 2, signals are input to the controller 16 from a key switch 20 operating mode switches 21, accelerator pedal depression sensor 22, brake switch 23, vehicle speed sensor 24, battery temperature sensor 25, charge amount sensor 26, engine rotation speed sensor 27 and throttle opening sensor 28.

The key switch 20 outputs an ON signal when an ignition key of the vehicle is set to an ON position for energizing the electric devices in the vehicle, or to a START position for starting the engine 2 by the motor 1, and outputs an OFF signal in all other cases.

The operating mode switches 21 output a signal representing a position of a selector lever provided in the vehicle whereby the driver can select the operating mode of the continuously variable transmission 5.

Operating modes parking P, neutral N, reverse R and drive D are set in the continuously variable transmission 5, and selection of the operating mode is performed by the driver by setting the selector lever to the position corresponding to these modes.

The operating mode switches 21 are provided for each position. The switch set in the selected position outputs an ON signal, and the switches in the other positions output an OFF signal so that the controller 16 can identify the selected operating mode.

The accelerator pedal depression sensor 22 detects a vehicle accelerator pedal depression amount and outputs a corresponding signal.

The brake switch 23 outputs an ON signal when a brake pedal of the vehicle is depressed, and outputs an OFF signal when it is not depressed.

The vehicle speed sensor 24 detects the running speed of the vehicle and outputs a corresponding signal.

The battery temperature sensor 25 detects the temperature of the battery 15 and outputs a corresponding signal.

The charge amount sensor 26 detects the State Of Charge (SOC) which is a representative value of the charge amount of the battery 15.

The engine speed sensor 27 detects the rotation speed of the engine 2 and outputs a corresponding signal.

The throttle opening sensor 28 detects the opening degree of a throttle 39 described later, and outputs a corresponding signal.

Figure 5:
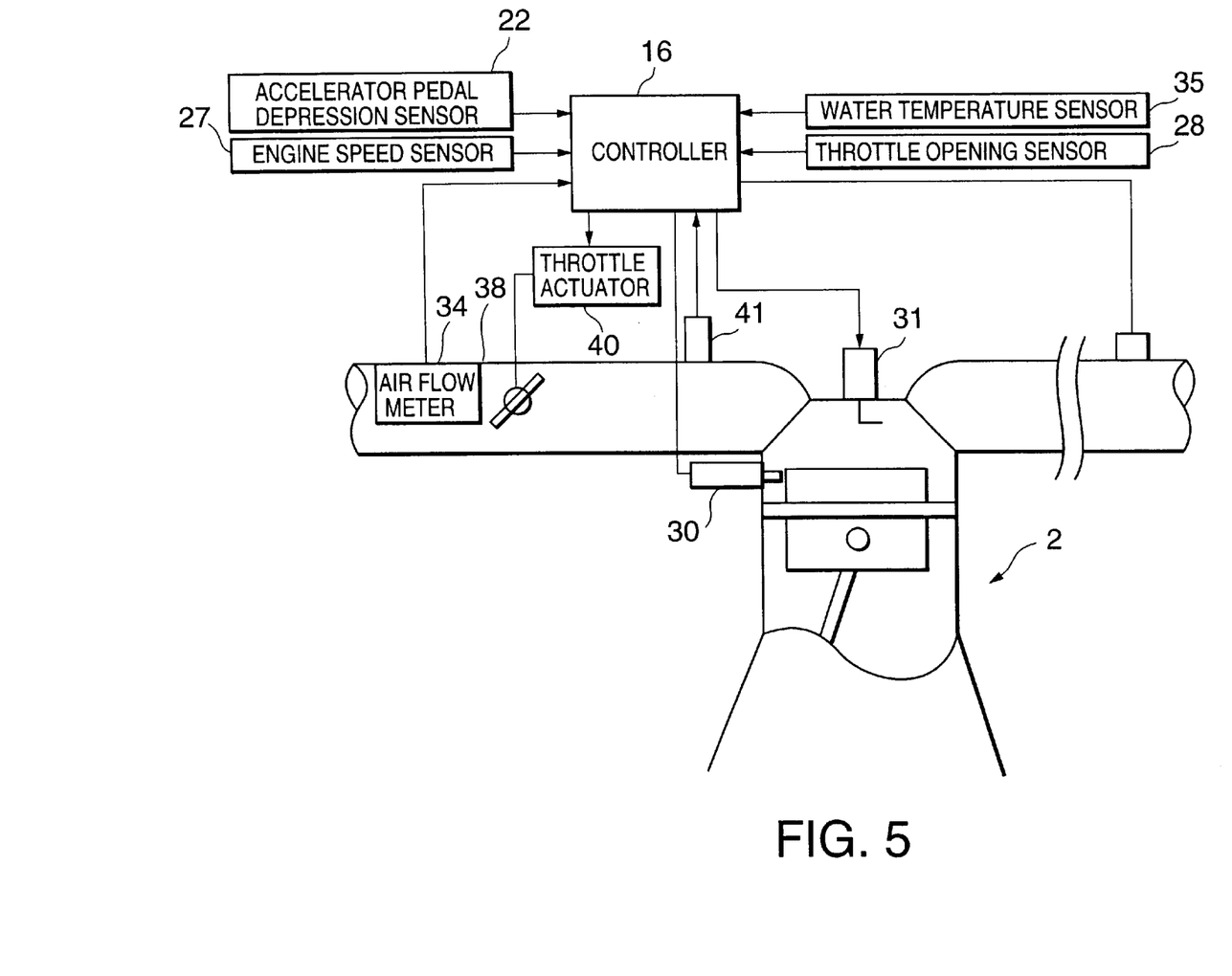
FIG. 5 is a schematic diagram of essential parts of the drive force control device for the purpose of describing a relation between the control device and the engine.

An air flow meter 34, water temperature sensor 35 and intake air pressure sensor 41 shown in FIG. 5 are also connected to the controller 16.

The air flow meter 34 detects an intake air flowrate of an inlet pipe 38 of the engine, and outputs a corresponding signal to the controller 16.

The water temperature sensor 35 detects a cooling water temperature TMP of the engine 2, and inputs a corresponding signal to the controller 16.

The pressure sensor 41 detects the pressure downstream of the throttle 39 which is installed in the intake pipe 38, and inputs a corresponding signal to the controller 16.

This pressure is used for the calculation of a loss torque due to the pumping loss of the engine.

A fuel injector 30, spark plug 31, valve timing adjusting mechanism 32, the throttle 39 and a throttle actuator 40 which operates the throttle 39 are also connected to the controller 16.

The controller 16 operates the throttle 39 so as to increase or decrease the intake air flowrate of the inlet pipe 38 by a signal output to the throttle actuator 40, and thereby increases or decreases the output of the engine 2. The actuator 40 may for example comprise a step motor which responds to the output signal of the controller 16, and it drives the throttle 39 to an opening degree according to the output signal of the controller 16.

The controller 16 controls the fuel injection amount and timing by the fuel injector 30, by a signal output to the fuel injector 30.

The controller 16 also controls the timing of the ignition of the injected fuel in the engine 2 by a signal output to the spark plug 31.

The controller 16 further controls the opening/closing timing of intake and exhaust valves of the engine 2 by a signal output to the valve timing adjustable mechanism 32. A low-voltage auxiliary battery 33 is also connected to the controller 16, the controller 16 being operated by the power of this auxiliary battery 33.

The above control is performed according to preset criteria based on the above-mentioned signals.

Next, the control of the engine output according to this invention is described.

The controller 16 determines a target engine torque TTE of the engine 2 based on the above-mentioned input signals, and determines a target throttle opening TGTVO in the normal running state when the accelerator pedal is depressed based on the target engine torque TTE. On the other hand, when the accelerator pedal is not depressed, the target throttle opening TGTVO is determined according to the engine rotation speed.

Based on the deviation between the target throttle opening TGTVO determined in this way and the actual throttle opening TVO detected by the throttle opening sensor 28, the actuator 40 which drives the throttle 39 is feedback controlled so as to achieve the target throttle opening TGTVO.

Next, the process of determining the target throttle opening TGTVO performed by the controller 16 will be described referring to FIGS. 6–11. The process of determining this target throttle opening TGTVO by the controller 16 is performed repeatedly at an interval of, for example 10 milliseconds.

Figure 6:
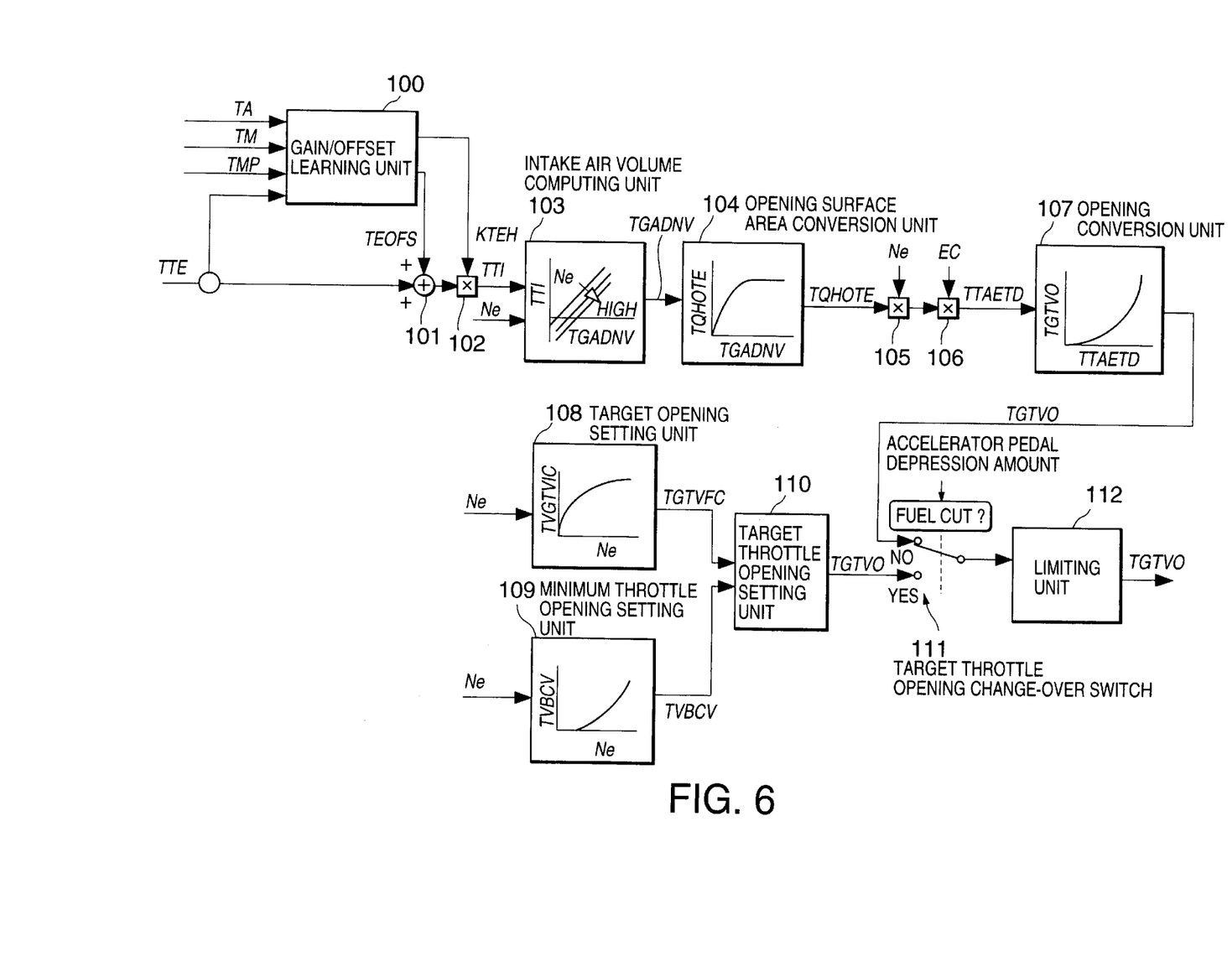
FIG. 6 is a block diagram showing the construction of a controller according to this invention.
Figure 7:
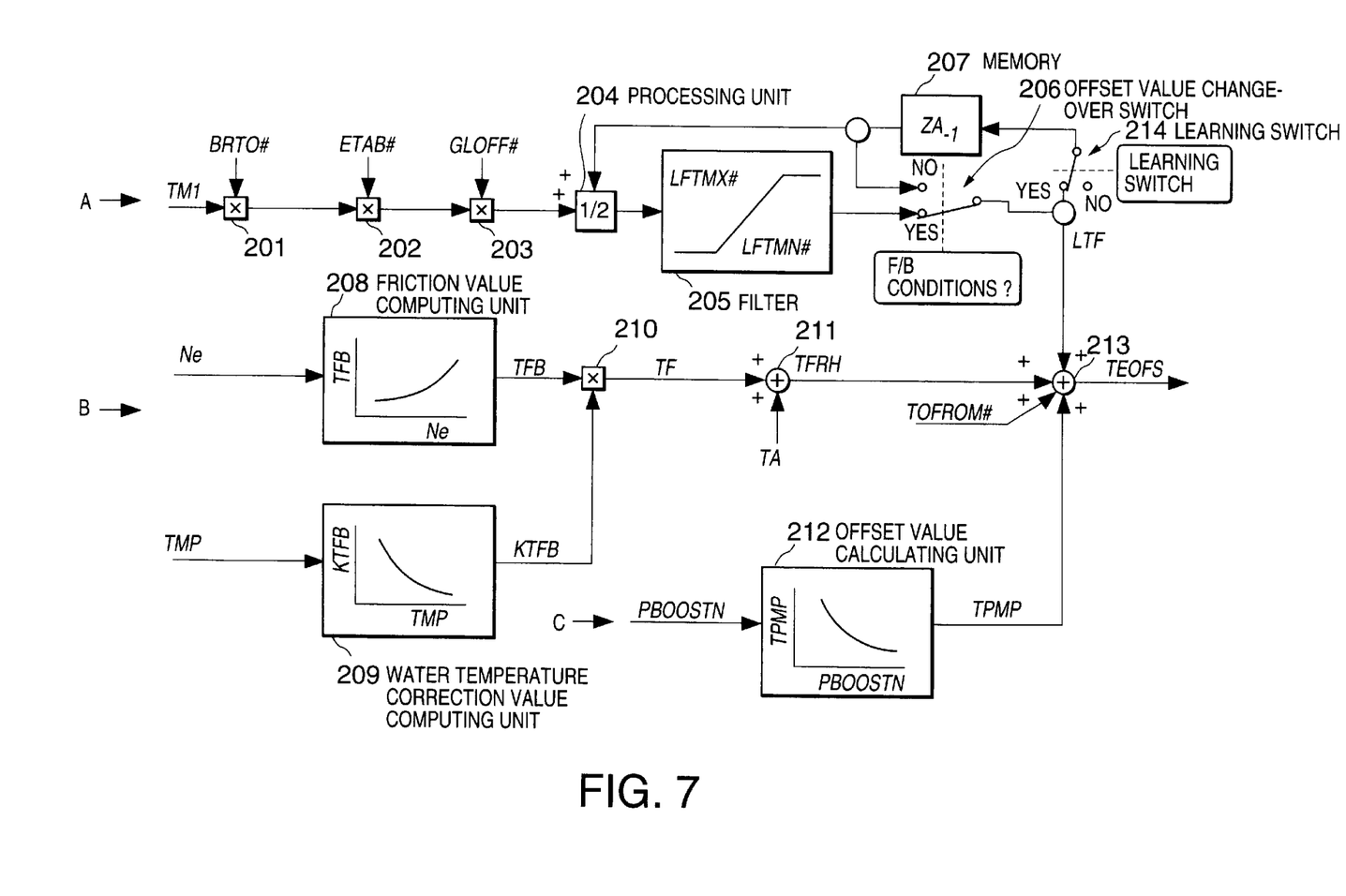
FIG. 7 is a block diagram describing a process for calculating a feedback learning value LTF, offset value TFRH and pumping loss TPMP performed by the controller.
Figure 8:
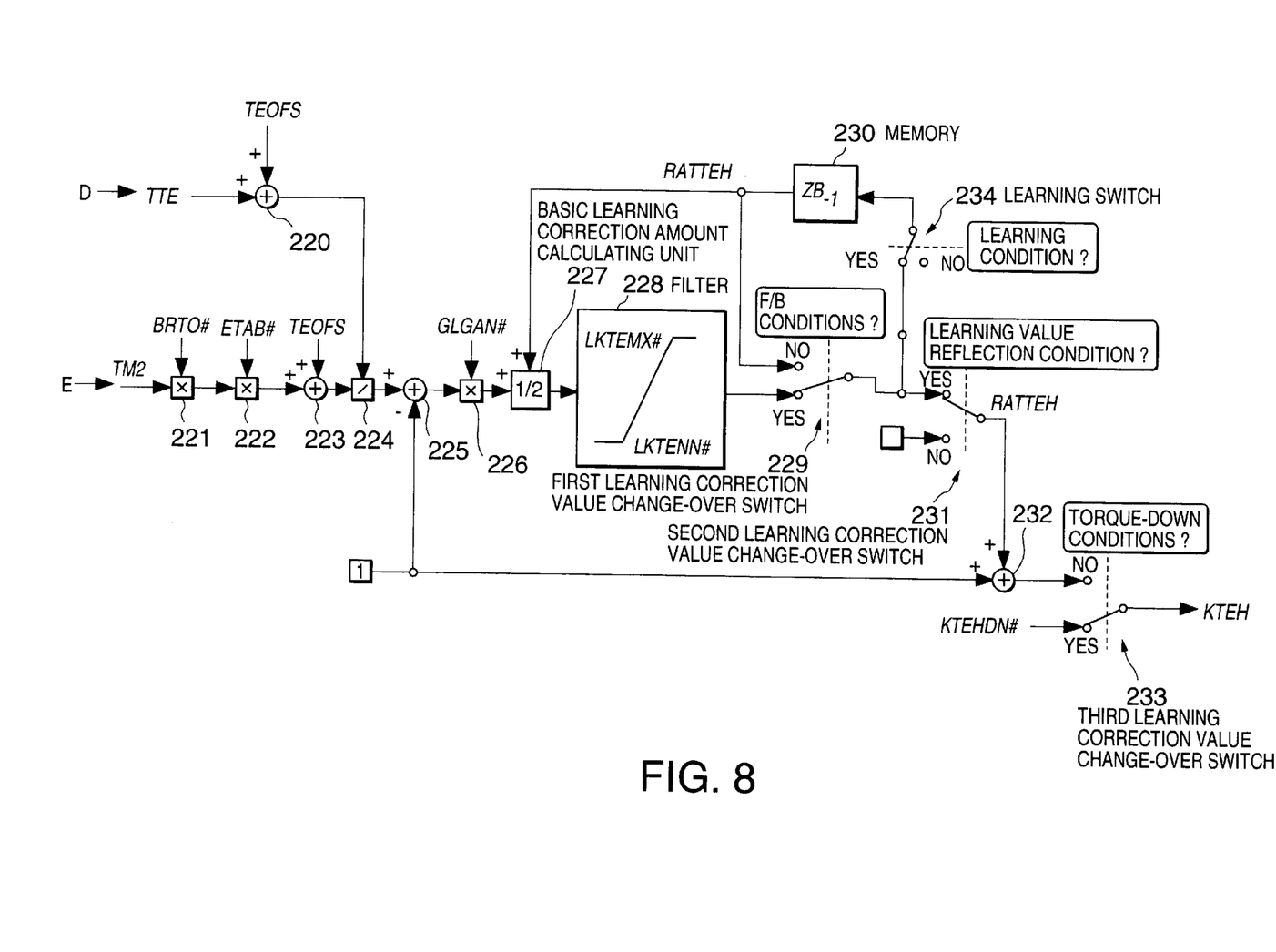
FIG. 8 is a block diagram describing the process of calculating a learning gain KTEH performed by the controller.

For performing this process, the controller 16 comprises the processing units shown in FIGS. 6–8. These units are virtual units constructed from the functions of the above-mentioned CPU, ROM and RAM.

Referring first to FIG. 6, a gain/offset learning unit 100 calculates a learning value TEOFS of the offset amount and a learning gain KTEH of the offset amount which should be added to the target engine torque TTE determined based on the depression amount of the accelerator pedal.

The learning value TEOFS and learning gain KTEH of the offset amount are values for compensating the target engine torque TTE to the final target engine torque TTI considering the torques which should be added to the target engine torque TTE, such as a torque TM required for the engine 2 to generate power through the motor 1, and a torque TA for driving auxiliary instruments such as an air conditioner. The details of these calculations will be described in detail later.

The offset amount learning value TEOFS which is calculated is added to the target engine torque TTE by an adder 101. The final target engine torque TTI is calculated by a multiplier 102 which multiplies the output of the adder 101 by the learning gain KTEH.

An intake air volume computing unit 103 calculates a volumetric flowrate TGADNV of the intake pipe 38 by looking up a map prestored by the controller 16, based on the final target engine torque TTI and the engine rotation speed NE detected by the engine speed sensor 27. This volumetric flowrate TGADNV expresses the total intake air amount in the intake stroke of one cylinder of the engine 2 as a conversion value per one (1) cubic centimeter (cc) of the cylinder exhaust amount.

An opening surface area conversion unit 104 calculates a required opening surface area TQHOTE of the intake pipe 38 by looking up a map prestored by the controller 16 based on the volumetric flowrate TGADNV.

This required opening surface area TQHOTE is therefore also a value corresponding to the aforesaid conversion value obtained by converting the total intake air amount in the intake stroke of one cylinder per 1 cc of the cylinder exhaust amount.

Herein, an opening surface area TTAETD corresponding to the total intake air volume of the engine is calculated by a multiplier 105 multiplying the required opening surface area TQHOTE by the engine rotation speed NE, and a multiplier 106 multiplying by a cylinder exhaust amount EC.

An opening conversion unit 107 converts this opening surface area TTAETD into the target throttle opening TGTVO by looking up a map prestored in the controller 16.

This target throttle opening TGTVO is a target opening of the throttle 39 in the normal running state when the accelerator pedal is depressed.

On the other hand, during coasting when the accelerator pedal is not depressed or during braking, fuel cut of the engine 2 and regenerative braking of the motor 4 is performed. The target throttle opening TGTVO in this case is determined as follows.

First, a target opening setting unit 108 determines a target throttle opening TGTVFC during fuel cut by looking up a map prestored in the controller 16 based on the engine rotation speed NE. When the motor 4 performs regenerative braking, the throttle opening of the engine 2 is large, but as the rotation resistance of the engine 2 is small, power generation efficiency is high. However, if the throttle opening is increased and the accelerator pedal is depressed again, a large amount of fuel is suddenly supplied to the engine 2, and the engine output torque abruptly increases. In this map, the target throttle opening TGTVFC is set so that the dual objectives of power generation efficiency and suppression of a sharp increase of torque when the accelerator is depressed, are achieved.

A minimum throttle opening setting unit 109 sets a minimum throttle opening TVBCV based on the engine rotation speed NE so that the negative pressure in the intake pipe 38 does not become excessive. This value is also looked up from a map prestored in the controller 16 based on the engine rotation speed NE.

A target throttle opening setting unit 110 selects the larger value of the target throttle opening TGTVFC and minimum throttle opening TVBCV during fuel cut, and outputs it as the target throttle opening TGTVO.

A target throttle opening change-over switch 111 changes over between the target throttle opening TGTVO output by the opening conversion unit 107 and the target throttle opening TGTVO output by the target throttle opening setting unit 110 according to whether or not fuel cut is being performed.

The determining of whether or not fuel cut is being performed is based on the accelerator pedal depression amount detected by the accelerator pedal depression sensor 22. That is, when the accelerator pedal depression amount is 0it is determined that fuel cut is being performed, and in all other cases it is determined that fuel cut is not being performed.

A limiting unit 112 compares the target throttle opening TGTVO selected in this way with a target throttle opening $TGTVO_{-1}$ output in the immediately preceding control cycle, and limits the throttle opening variation rate so that it does not exceed a predetermined limiting value. The target throttle opening TGTVO after limitation is output to the actuator 40 which drives the throttle 39.

The actuator 40 is also feedback controlled by another unit in the controller 16 based on the real throttle opening detected by the throttle opening sensor 28 mentioned above so that the target throttle opening TGTVO is achieved.

Next, the process of computing the learning value TEOFS of the above-mentioned offset amount and a learning gain KTEH will be described referring to FIGS. 7 and 8. These figures show the construction of the above-mentioned gain/offset learning unit 100.

In FIGS. 7, 8 and the following description, the mark # appended at the end of a number signifies a constant defined beforehand by calculation or experiment.

The maps used in the computation process are drawn up beforehand based on experiment.

An arrow A in FIG. 7 shows a process which calculates an offset value LTF based on a motor torque TM1.

The motor torque TM1 signifies an output torque generated by the motor 1 to make the idle rotation speed coincide with a target value during idle running of the engine 2. The clutch 3 is released in the idle running state.

The idle rotation speed of the engine 2 may be excessive or insufficient due to fluctuation of running conditions, etc.

If such an excess or deficiency arises, the idle rotation speed is maintained at the desired value by the motor 1 adding a positive or negative torque to the engine torque.

Specifically, the controller 16 performs out feedback control of the output torque of the motor 1 by the signal output to the inverter 11 so that the deviation between the idle rotation speed detected by the rotation speed sensor 27 and the target idle rotation speed is zero.

Figure 9:
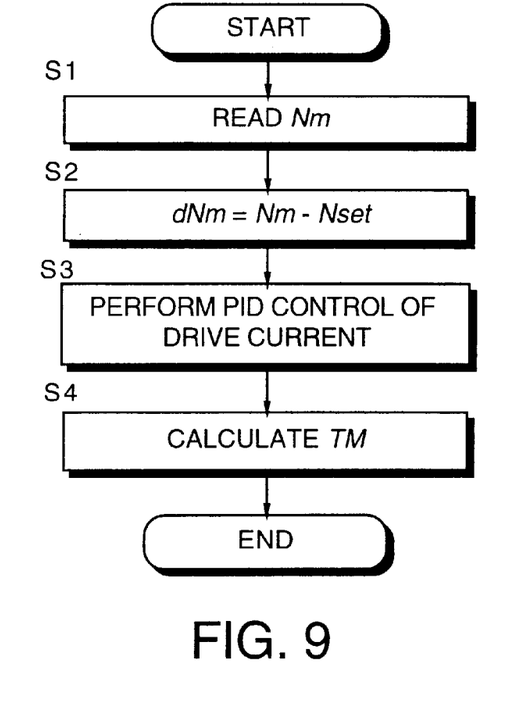
FIG. 9 is a flowchart describing a motor control process for idle running of the engine performed by the controller.

This control performed by the controller 16 will be described referring to the flowchart of FIG. 9.

First, the controller 16 reads a rotation speed Nm of the motor 1 in a step S1. As the motor 1 and engine 2 always rotate in a fixed ratio, the motor rotation speed Nm may be known by converting the output signal of the engine rotation speed sensor 27.

In a step S2 a deviation dNm between the rotation speed Nm of the motor 1 and a preset target rotation speed Nset is calculated. Here, the target rotation speed Nset corresponds to the target idle rotation speed of the engine 2, the target rotation speed Nset of the motor 1 being calculated by multiplying the target idle rotation speed by the above-mentioned fixed ratio.

In a step S3 a proportional/integral/ derivative control (PID control) is applied to the drive current of the motor 1 supplied from the inverter 11 based on the deviation dNm.

Figure 10:
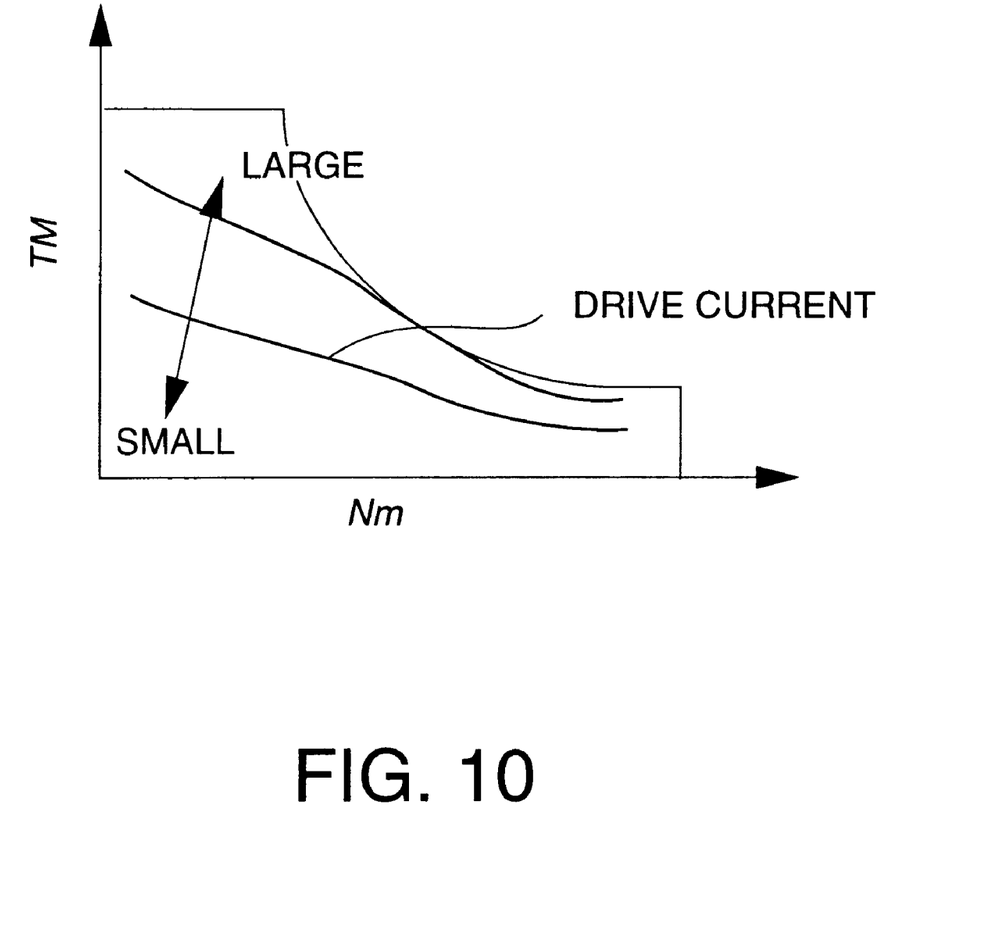
FIG. 10 is a diagram describing the contents of a map which calculates a generated torque from a current value and rotation speed of the motor stored in the controller.

In a step S4 the output torque TM of the motor 1 is calculated referring to the map shown in FIG. 10 from the rotation speed Nm of the motor 1, and the current value supplied from the inverter 11 to the motor 1. Since the inverter 11 is directly controlled by the controller 16, the current value supplied from the inverter 11 to the motor 1 is known to the controller 16. In other words, the inverter 11 works as a sensor for detecting the current value supplied to the motor 1.

Thus, the output torque TM of the motor 1 obtained is used as the motor torque TM1 in the process A of FIG. 7.

Describing the process of FIG. 7, the multiplier 201 first multiplies the gear ratio BRTO# of the engine 2 and motor 1 by the motor torque TM. As the motor 1 and engine 2 are joined under a predetermined reduction gear ratio, this calculation is performed to convert the motor torque TM1 to the torque of the rotation shaft of the engine 2.

The multiplier 202 also multiplies the value obtained by a gear efficiency ratio ETAB#, and a multiplier 203 further multiplies it by a predetermined learning gain GLOFF# based on experiment.

The output of the multiplier 203 is input to a processing unit 204. A learning value $ZA^{-1}$ is also input to the basic offset amount calculating unit 204 from a memory 207. This memory 207 stores the first offset amount LTF output on preceding occasions when the process was executed as the learning value $ZA^{-1}$ for different water temperatures TMP. The learning value $ZA^{-1}$ input to the basic offset amount calculating unit 204 is therefore selected according to the water temperature TMP at that time.

The basic offset amount calculating unit 204 calculates an average value using these two values, and outputs it as the basic offset amount.

To avoid incorrect learning, a filter 205 applies limits to the basic offset amount obtained by an upper limiting value LFTMX# and lower limiting value LFTMN#.

An offset value change-over switch 206 determines whether or not predetermined feedback conditions hold, and when feedback conditions hold, the value after limiting is output as a first offset amount LTF. The predetermined feedback conditions are that the target engine torque TTE is zero, i.e., the clutch 3 is released, and the engine 2 is in the idle running state.

Storing of the first offset amount LTF in the memory 207 i.e., the learning of the first offset amount LTF, does not necessarily need to be performed every time the process is executed. For example, it may be performed when at least a predetermined time has elapsed from the immediately preceding learning, or when the variation of the engine cooling water temperature exceeds a predetermined variation value.

A learning switch 214 determines whether or not this condition holds, and stores the first offset amount LTF in the memory 207 only when this condition holds.

When the offset value change-over switch 206 determines that the feedback conditions do not hold, it outputs the learning value $ZA^{-1}$ stored in the memory 207 as the first offset amount LTF.

An arrow B in FIG. 7 shows a process for calculating an offset value TFRH equivalent to friction losses of the engine 2.

Here, a friction value computing unit 208 calculates a friction value TFB by looking up a map based on the engine rotation speed NE found by the engine rotation speed sensor 27. Also, a water temperature correction value computing unit 209 calculates a water temperature correction value KTFB by looking up a map based on the cooling water temperature TMP detected by the water temperature sensor 35.

The multiplier 210 calculates an engine friction TF by multiplying the friction value TFB by the water temperature correction value KTFB. Here, it is considered that the drive load of a compressor when the air conditioner is operating is also part of a friction loss.

An adder 211 calculates an offset value TFRH due to this friction loss by adding an engine torque TA equivalent to this load to the engine friction TF.

An arrow C in FIG. 7 shows a process for calculating an offset value TPMP equivalent to the loss torque due to the pumping loss of the engine.

Herein, an offset value calculating unit 212 determines the offset value TPMP by looking up a map based on an intake negative pressure PBOOSTN of the intake pipe 38 downstream of the throttle 39 detected by the pressure sensor 41.

An adder 213 computes a sum total value obtained by adding an adjusting value TOFROM# to the offset values LTF, TFRH and TPMP calculated in the above processes, as a final offset value TEOFS.

The adjusting value TOFROM# is a fixed value for fine adjustment set as necessary according to matching operations.

The offset value TEOFS set in this way represents an excess or deficiency amount of the real engine torque relative to the target engine torque TTE. Therefore, by learning this value according to ambient conditions such as water temperature, fluctuations of engine torque due to change of ambient conditions can be compensated and the engine output can be controlled to the target engine torque TTE.

This offset value TEOFS is sufficient as compensation for engine torque fluctuations during idle running. As the positive or negative torque applied by the motor 1 to maintain the target idle rotation speed is reflected in the offset value TEOFS as mentioned above, the target idle rotation speed will be attained if the throttle opening is controlled based on the offset value TEOFS as shown in FIG. 6. When engine control to the target idle rotation speed is attained, the torque applied by the motor 1 will be effectively zero. In other words, the throttle opening at which the torque of the motor 1 becomes zero during idle running is attained by the offset value TEOFS.

Next, the process of computing the learning gain KTEH will be described referring to FIG. 8. This process is intended to correct the engine torque more suitably when the vehicle is running under drive force.

The real engine torque in the electric power generating state when the engine 2 is run so as to drive the motor 1 as a generator, is calculated from the power generation amount of the motor 1 at this time.

The vehicle running conditions assumed for this process are that the clutch 3 is released, and that the engine 2 is driven so that the motor 1 generates a predetermined amount of power.

In the process shown by the arrow D, the learning value TEOFS of the above-mentioned offset amount is added to the target engine torque TTE determined by the adder 220 based on the accelerator pedal depression amount.

Figure 11:
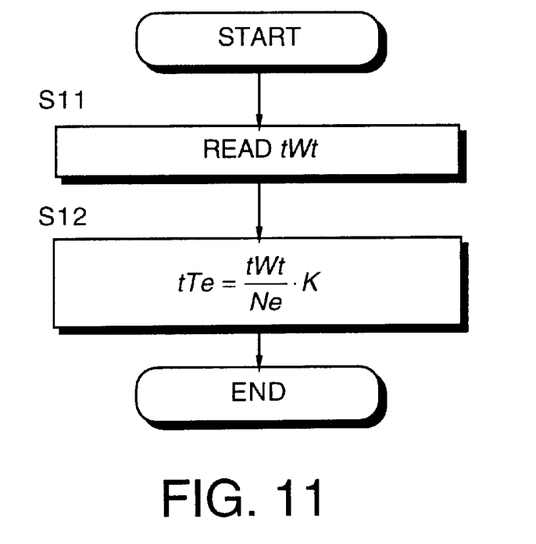
FIG. 11 is a flowchart describing a process performed by the controller for calculating an engine torque required for the motor to generate a predetermined power.

The process shown by the arrow E is based on a motor drive torque TM2. The process of calculating this motor drive torque TM2 is shown in FIG. 11.

First, the controller 16 detects a power generation amount tWt of the motor 1 by a signal from the inverter 11 in a step S11.

In the next step S12 the torque tTe applied by the engine to the motor 1 to generate a power generation amount tWt is calculated by the following equation.

$$tTe = \frac{tWt}{NE} \cdot K$$

where, NE=engine rotation speed and
K=constant.

In the process E shown in FIG. 8, this torque tTe is used as the motor drive torque TM2.

In the above-mentioned process E, as in the above-mentioned process A of FIG. 7, a multiplier 221 multiplies the motor drive torque TM2 by a gear ratio BRTO#, a multiplier 222 multiplies the motor drive torque TM2 by the gear efficiency ratio ETAB#, and an adder 223 adds the learning value TEOFS of the offset amount to it.

A divider 224 then calculates the ratio of the value obtained in this way to the value obtained by the process E.

A subtractor 225 subtracts 1.0 from this ratio, and a multiplier 226 multiplies the value obtained by a feedback learning gain GLGAN#.

Here, if the real output torque of the engine coincides with the target engine torque TTE, the motor drive torque TM2 will become equal to a value corresponding to the target engine torque TTE. In this case, the calculation result of the divider 224 is 1.

When the real engine torque and target engine torque do not coincide, the motor drive torque TM2 also does not coincide with the value corresponding to the target engine torque TTE. The subtractor 225 calculates a deviation between the calculation result of the divider 224 and 1, and the multiplier 226 multiplies the deviation by the learning gain GLGAN#.

The value obtained is input to a basic learning correction amount calculating unit 227. A learning value $ZB^{-1}$, stored in a memory 230 according to the water temperature TMP is also input to the basic learning correction amount calculating unit 227, and the basic learning correction amount calculating unit 227 calculates the average of these values.

Further, a filter 228 limits the output of the basic learning correction amount calculating unit 227 by an upper limiting value LKTEMX# and lower limiting value LKTENN# to prevent incorrect learning.

A first learning correction value change-over switch 229 determines whether or not predetermined feedback conditions hold, and when they hold, outputs the output value of the filter 228 as a learning correction amount RATTEH. This value is also stored in the memory 230 as a learning value. The predetermined feedback conditions are that the clutch 3 is released and that the engine is running to charge the motor 1 with a higher engine torque than during idle running.

When this feedback condition does not hold, the first learning correction value change-over switch 229 outputs the learning value $ZB^{-1}$ stored in the memory 230 as the learning correction amount RATTEH.

Further, the second learning correction value change-over switch 231 determines whether or not a learning value reflection condition holds. When it holds, the learning correction amount RATTEH output by the first learning correction value change-over switch 229 is output, and when it does not hold, 0 is output, respectively.

This learning value reflection condition is set, for example, to eliminate startup or warming up of the engine 2.

Storing of the learning value in the memory 230, i.e., learning of the learning correction amount, does not necessarily need to be performed every time the process is executed. For example, it may be performed when at least a predetermined time has elapsed from the immediately. preceding learning, or when the variation of the engine cooling water temperature exceeds a predetermined variation value. A learning switch 234 determines whether or not this condition holds, and stores the learning correction amount RATTEH in the memory 230 only when this condition holds.

The adder 232 adds 1 to the learning correction amount RATTEH output by the second learning correction value change-over switch 231.

Further, a third learning correction value change-over switch 233 determines whether torque-down conditions hold, and when they hold, a predetermined KTEHDN# is output as the learning value gain KTEH.

When they do not hold, the output of the adder 232 is output as the learning value gain KTEH. Torque down conditions are equivalent to, for example, fuel reduction in the high-speed rotation region of the engine 2.

In the gain learning process of FIG. 8, a learning gain is determined from the difference of the real engine torque when the controller 16 drives the motor 1 so that the predetermined power amount is generated, and the target engine torque TTE. Based on this learning gain, the output torque of the engine 2, i.e., the throttle opening of the engine, increases and decreases. Therefore, by suitably compensating the fluctuation of the output torque of the engine 2 due to change of ambient conditions such as water temperature, or to time-dependent variation of engine characteristics, the engine output can be correctly controlled to the target value over a wide range of running regions.

The contents of Tokugan Hei 10-268037 with a filing date of Sep. 22, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above -mentioned embodiment, the first offset amount LTF and the learning correction amount RATTEH are learned according to the water temperature TMP, but another ambient condition which affects the running of the engine (2) is atmospheric pressure. The effect on the output torque of the engine (2) due to the variation of atmospheric pressure may therefore be eliminated by providing a sensor which detects atmospheric pressure, and performing learning according to atmospheric pressure.

The embodiments of this invention in which an exclusive property or privilege is claimed are defined as follows:

What is claimed is:

1. An engine output control device for use with a hybrid vehicle wherein an engine and a motor/generator are connected so that the engine and the motor/generator can be driven by each another, and the engine is connected with a motor and a drive wheel via a clutch, comprising:
   a mechanism which increases and decreases an output torque of the engine;
   a sensor which detects an output of the motor/generator; and
   a microprocessor programmed to:
      control said output torque increase and decrease mechanism so that the output of said motor/generator is equal to a predetermined output when the engine is in a predetermined running state and the clutch is released.

2. An engine output control device as defined in claim 1, wherein said engine output control device further comprises a sensor which detects an idle running state of the engine, and a sensor which detects a rotation speed of the engine, said predetermined engine running state is the idle running state of the engine, and said microprocessor is further programmed to control the output of the motor/generator so that the rotation speed of the engine in the idle running state coincides with a predetermined speed, and to correct a control of said output torque increase and decrease mechanism so that the output of the motor/generator is equal to a predetermined torque.

3. An engine output control device as defined in claim 2, wherein said predetermined torque is set to zero.

4. An engine output control device as defined in claim 2, wherein said engine output control device further comprises a sensor which detects an ambient running condition of the engine, and said microprocessor is further programmed to learn a correction amount for the control of said output torque increase and decrease mechanism as a learning correction amount under a predetermined learning condition for said ambient running condition, and apply said learning correction amount in a subsequent correction of the control of said output torque increase and decrease mechanism.

5. An engine output control device as defined in claim 4, wherein said ambient condition detecting sensor comprises a sensor which detects a cooling water temperature of said engine.

6. An engine output control device as defined in claim 4, wherein said microprocessor is further programmed to determine that said learning condition holds when a predetermined time has elapsed from the immediately preceding occasion on which learning was performed.

7. An engine output control device as defined in claim 4, wherein said ambient condition detecting sensor comprises a sensor for detecting a cooling water temperature of said engine, and said microprocessor is further programmed to determine that said learning condition holds when a variation of the cooling water temperature exceeds a predetermined variation value.

8. An engine output control device as defined in claim 4, wherein said microprocessor is further programmed to apply said learning correction amount to correction of the control of said output torque increase and decrease mechanism in a running condition of the engine different from the running condition when said learning correction amount was obtained.

9. An engine output control device as defined in claim 1, wherein said output torque increase and decrease mechanism comprises a throttle which increases and decreases an intake air volume of said engine according to an opening of said throttle, and an actuator which varies the opening of said throttle according to a signal, and said microprocessor is further programmed to output the signal to said actuator so that the output of said motor/generator is equal to a predetermined output when the engine is in said predetermined engine running state.

10. An engine output control device as defined in claim 1, wherein said output control device further comprises a sensor which detects a power generation amount of the motor/generator, said predetermined engine running state is a state wherein the engine attains a predetermined output torque, and said microprocessor is further programmed to correct the control of said output torque increase and decrease mechanism so that the output of the motor/generator is a predetermined power generation amount.

11. An engine output control device as defined in claim 10, wherein said engine output control device further comprises a sensor which detects an ambient running condition of the engine, and said microprocessor is further programmed to learn said correction amount for the control of said output torque increase and decrease mechanism as a learning correction amount under a predetermined learning condition for said ambient running condition, and apply said learning correction amount in a subsequent correction of the control of said output torque increase and decrease mechanism.

12. An engine output control device as defined in claim 11, wherein said ambient condition detection sensor comprises a sensor which detects a cooling water temperature of the engine.

13. An engine output control device as defined in claim 11, wherein said microprocessor is further programmed to determine that said learning condition holds when a predetermined time has elapsed from the immediately preceding occasion on which learning was performed.

14. An engine output control device as defined in claim 11, wherein said ambient condition detecting sensor comprises a sensor which detects a cooling water temperature of the engine, and said microprocessor is further programmed to determine that said learning condition holds when a variation of the cooling water temperature exceeds a predetermined variation value.

15. An engine output control device as defined in claim 11 wherein said microprocessor is further programmed to apply said learning correction amount in a subsequent correction of the control of said output torque increase and decrease mechanism in a running condition of the engine different from the running condition when said learning correction amount was obtained.

16. An engine output control device for use with a hybrid vehicle wherein an engine and a motor/generator are connected so that the engine and the motor/generator can be driven by each another, and the engine is connected with a motor and a drive wheel via a clutch, comprising:

means for increasing and decreasing an output torque of the engine;

means for detecting an output of the motor/generator; and means for controlling said output torque increase and decrease means so that the output of said motor/generator is equal to a predetermined output when the engine is in a predetermined running state and the clutch is released.

17. An engine output control method for a hybrid vehicle wherein an engine and a motor/generator are connected so that the engine and the motor/generator can be driven by each another, and the engine is connected with a motor and a drive wheel via a clutch, comprising:

detecting an output of the motor/generator; and controlling the output of said motor/generator to be equal to a predetermined output when the engine is in a predetermined running state and the clutch is released.

* * * * *